US011945444B2

(12) United States Patent
Tsuji

(10) Patent No.: US 11,945,444 B2
(45) Date of Patent: Apr. 2, 2024

(54) VEHICLE MOVEMENT CONTROL APPARATUS

(71) Applicant: TOYOTA JIDOSHA KABUSHIKI KAISHA, Toyota Aichi-ken (JP)

(72) Inventor: Takahiro Tsuji, Nisshin (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 18/090,004

(22) Filed: Dec. 28, 2022

(65) Prior Publication Data

US 2023/0132470 A1 May 4, 2023

Related U.S. Application Data

(63) Continuation of application No. 16/713,628, filed on Dec. 13, 2019, now abandoned.

(30) Foreign Application Priority Data

Dec. 17, 2018 (JP) ................................ 2018-235312

(51) Int. Cl.
*B60W 30/18* (2012.01)
*B60W 10/06* (2006.01)
(Continued)

(52) U.S. Cl.
CPC ...... *B60W 30/18181* (2013.01); *B60W 10/06* (2013.01); *B60W 10/18* (2013.01);
(Continued)

(58) Field of Classification Search
CPC ........... B60W 30/18181; B60W 10/20; B60W 10/06; B60W 10/18; B60W 2510/20; B60W 2520/105; B60W 2710/20; B60W 2720/106; B60W 2710/0616; B60W 2710/18; B60W 2520/14;
(Continued)

(56) References Cited

U.S. PATENT DOCUMENTS 10,053,088 B1 * 8/2018 Askeland ............... B60N 2/002
2015/0345967 A1 * 12/2015 Meuleau ............ G01C 21/3453
701/25
(Continued)

FOREIGN PATENT DOCUMENTS

JP 2009018623 A 1/2009
JP 2015158467 A 9/2015
(Continued)

*Primary Examiner* — Aniss Chad
*Assistant Examiner* — Chase L Cooley
(74) *Attorney, Agent, or Firm* — Dinsmore & Shohl LLP

(57) ABSTRACT

The vehicle movement control apparatus of the disclosure sets an update movement route as a target movement route when an update condition is satisfied. The apparatus acquires a turning characteristic, an acceleration characteristic, and a deceleration characteristic of a vehicle while executing an automatic movement control to cause the vehicle to move along the update movement route. The apparatus updates vehicle behavior characteristic data so as to represent actual vehicle behavior characteristics, based on the acquired turning characteristics, the acquired acceleration characteristic, and the acquired deceleration characteristic.

15 Claims, 8 Drawing Sheets

(51) Int. Cl.
*B60W 10/18* (2012.01)
*B60W 10/20* (2006.01)
*B62D 5/04* (2006.01)
*F02D 41/30* (2006.01)
*G05D 1/00* (2006.01)

(52) U.S. Cl.
CPC ............. *B60W 10/20* (2013.01); *B62D 5/046* (2013.01); *F02D 41/3005* (2013.01); *G05D 1/0223* (2013.01); *B60W 2510/20* (2013.01); *B60W 2520/105* (2013.01); *B60W 2520/125* (2013.01); *B60W 2520/14* (2013.01); *B60W 2710/0616* (2013.01); *B60W 2710/18* (2013.01); *B60W 2710/20* (2013.01); *B60W 2720/106* (2013.01)

(58) Field of Classification Search
CPC ....... B60W 2520/125; B60W 60/0011; B60W 2540/049; B60W 60/0051; B60W 2540/10; B60W 2540/12; B60W 2540/18; B60W 30/10; B60W 40/08; B60W 40/10; B60W 2420/42; B60W 2420/52; B62D 5/046; B62D 6/00; B62D 15/025; G05D 1/0223; G05D 2201/0213; F02D 41/3005; F02D 2200/701
See application file for complete search history.

(56) References Cited

U.S. PATENT DOCUMENTS

| | | | |
|---|---|---|---|
| 2017/0010613 A1 | 1/2017 | Fukumoto | |
| 2018/0297587 A1* | 10/2018 | Kasaiezadeh Mahabadi | B60W 50/00 |
| 2019/0361456 A1 | 11/2019 | Zeng | |
| 2020/0102904 A1* | 4/2020 | Dudar | F02D 41/22 |

FOREIGN PATENT DOCUMENTS

| | | |
|---|---|---|
| JP | 2017041038 A | 2/2017 |
| JP | 2017172552 A | 9/2017 |

* cited by examiner

VEHICLE MOVEMENT CONTROL APPARATUS

CROSS-REFERENCE TO RELATED APPLICATION

This application is a continuation of U.S. patent application Ser. No. 16/713,628 filed Dec. 13, 2019 and claims priority to Japanese Patent Application No. 2018-235312 filed on Dec. 17, 2018, incorporated herein by reference in its entirety.

BACKGROUND

Field

The disclosure relates to a vehicle movement control apparatus.

Description of the Related Art

There is known a vehicle movement control apparatus configured to execute a lane change control to cause a vehicle to move to a next vehicle lane without an operation to operate a steering wheel of the vehicle by a driver of the vehicle. The next vehicle lane is a vehicle lane next to a vehicle lane in which the vehicle moves currently. Further, there is also known a vehicle movement control apparatus configured to execute a control to cause the vehicle to move to the next vehicle lane along a target path, using a vehicle behavior model (for example, see JP 2009-18623 A). Hereinafter, the vehicle movement control apparatus described in JP 2009-18623 A will be referred to as "the known control apparatus".

The known control apparatus sets an update path as the target path when (i) the known control apparatus executes the lane change control, and (ii) updating of parameters in the vehicle behavior model is needed. The update path is the target path used for updating the parameters in the vehicle behavior model and is different from the target path normally set when the lane change control is not executed.

The vehicle behavior model represents a relationship between (i) control amounts input into vehicle actuators which control behavior of the vehicle and (ii) behavior characteristic of the vehicle derived from inputting the control amounts into the vehicle actuators, respectively.

Then, the known control apparatus causes the vehicle to move to the next vehicle lane along the update path. The known control apparatus updates the parameters in the vehicle behavior model, based on information on the behavior of the vehicle moving along the update path.

As described above, the known control apparatus causes the vehicle to move along the update path different from the normally-set target path in order for updating the parameters in the vehicle behavior model. Thereby, although the vehicle can move to the next vehicle lane along the normally-set target path, the vehicle moves along the update path different from the normally-set target path. Thus, occupants including the driver may feel uneasy.

SUMMARY

The embodiments herein have been made for solving a problem described above. An object of the present disclosure is to provide a vehicle movement control apparatus which can update vehicle behavior characteristics representing the relationship between (i) the control amounts input into the vehicle actuators and (ii) the behavior of the vehicle derived from inputting the control amounts into the vehicle actuators, respectively with preventing the occupants from feeling uneasy.

A vehicle movement control apparatus according to the disclosure comprises at least one sensor and an electronic control unit.

The at least one sensor detects a turning characteristic, an acceleration characteristic, and a deceleration characteristic of a vehicle.

The electronic control unit is configured to execute an automatic movement control to cause the vehicle to move from a current place to a destination along a target movement route without a driving operation for driving the vehicle by a driver of the vehicle.

The electronic control unit is further configured to memorize a relationship between control amounts input into vehicle actuators and vehicle behavior characteristics derived from inputting the control amounts into the vehicle actuators, respectively as vehicle behavior characteristic data. The vehicle behavior characteristics includes (i) the turning characteristic, (ii) the acceleration characteristic, and (iii) the deceleration characteristic of the vehicle. The control amounts are input to the vehicle actuators to activate the vehicle actuators, respectively. The vehicle actuators include (i) a turning actuator for turning the vehicle, (ii) an acceleration actuator for accelerating the vehicle, and (iii) a deceleration actuator for decelerating the vehicle.

The electronic control unit is further configured to set an update movement route as the target movement route when an update condition is satisfied. The update condition is a condition that an execution of the automatic movement control is requested. The update movement route is determined such that the vehicle is caused to move with turning, acceleration, and deceleration necessary to update the vehicle behavior characteristic data so as to represent the actual vehicle behavior characteristics.

The electronic control unit is further configured to execute the automatic movement control to (a) determining the control amounts to be input into the vehicle actuators as automatic control amounts so as to cause the vehicle to move along the target movement route, based on the vehicle behavior characteristic data and (b) input the determined automatic control amounts into the vehicle actuators, respectively when the execution of the automatic movement control is requested.

The electronic control unit is further configured to acquire the turning characteristic, the acceleration characteristic, and the deceleration characteristic of the vehicle from the at least one sensor while the electronic control unit executes the automatic movement control to cause the vehicle to move along the update movement route.

The electronic control unit is further configured to update the vehicle behavior characteristic data so as to represent the actual vehicle behavior characteristics, based on the acquired turning characteristics, the acquired acceleration characteristic, and the acquired deceleration characteristic.

The driver does not need to perform the driving operation for controlling the behavior of the vehicle when the automatic movement control is executed. In other words, all of processes to cause the vehicle to move including a process to set the target movement route are executed by the electronic control unit, not by the driver. Thus, the occupants is unlikely to feel uneasy even when the vehicle is caused to move along the update movement route which is not optimal in terms of (i) a distance of movement of the vehicle and (ii) time taken for the vehicle to move from the current place to the destination by the automatic movement control. The update movement route is set as the movement route capable of turning, accelerating, and decelerating the vehicle necessary to update the vehicle behavior characteristic data so as to represent the actual vehicle behavior characteristics. Thus, with the disclosure, the vehicle behavior characteristic data can be updated with preventing the occupants from feeling uneasy.

According to an aspect of the disclosure, the update condition may include a condition that updating of the vehicle behavior characteristic data is needed.

In some cases, the update movement route may not be optimal in terms of the distance of the movement of the vehicle and the time taken for the vehicle to arrive at the destination. With this aspect, the automatic movement control to cause the vehicle to move along such an update movement route is executed only when the updating of the vehicle behavior characteristic data is needed since the update condition is the condition that the execution of the automatic movement control is requested, and the updating of the vehicle behavior characteristic data is needed. Thereby, the automatic movement control to cause the vehicle to move along such an update movement route can be executed to the minimum extent.

According to another aspect of the disclosure, the update condition may include a condition that there is no occupant in the vehicle.

As described above, the update movement route may not be optimal in terms of the distance of the movement of the vehicle and the time taken for the vehicle to arrive at the destination. With this aspect, the automatic movement control to cause the vehicle to move along the update movement route is executed only when there is no occupant in the vehicle since the update condition is the condition that the execution of the automatic movement control is requested, and there is no occupant in the vehicle. Since the vehicle is caused to move with no occupant, the occupants do not feel uneasy even when the vehicle is caused to move along the update movement route which is not optimal in terms of the distance of the movement of the vehicle and the time taken for the vehicle to arrive at the destination. Thus, the vehicle behavior characteristic data can be updated with preventing the occupants from feeling uneasy.

According to further another aspect of the disclosure, the update condition may include a condition that (i) updating of the vehicle behavior characteristic data is needed, and (ii) there is no occupant in the vehicle.

As described above, the update movement route may not be optimal in terms of the distance of the movement of the vehicle and the time taken for the vehicle to arrive at the destination. With this aspect, the automatic movement control to cause the vehicle to move along the update movement route is executed only when the updating of the vehicle behavior characteristic data is needed, and there is no occupant in the vehicle since the update condition is the condition that the execution of the automatic movement control is requested, the updating of the vehicle behavior characteristic data is needed, and there is no occupant in the vehicle. Thus, the automatic movement control to cause the vehicle to move along the update movement route is executed to the minimum extent, and the vehicle behavior characteristic data can be updated with preventing the occupants from feeling uneasy.

According to further another aspect of the disclosure, the electronic control unit may be further configured to determine at least one of the automatic control amounts to a larger amount when the electronic control unit executes the automatic movement control to cause the vehicle to move along the update movement route with no occupant, compared with when the electronic control unit executes the automatic movement control to cause the vehicle to move along the same update movement route with the occupant.

When the vehicle is caused to move with no occupant by the automatic movement control, the movement of the vehicle with inputting the large control amount to at least one of the vehicle actuators does not render the occupants uneasy. In addition, when the large control amount is input into at least one of the vehicle actuators, a lot of data on the vehicle behavior characteristics can be acquired. Thereby, the vehicle behavior characteristic data can be updated to accurately represent the actual vehicle behavior characteristics. Thus, with this aspect, the vehicle behavior characteristic data can be updated to accurately represent the actual vehicle behavior characteristics with preventing the occupants from feeling uneasy.

According to further another aspect of the disclosure, the electronic control unit may be further configured to set an optimal movement route as the target movement route when the update condition is not satisfied. The optimal movement route is determined such that the vehicle is caused to move with reducing (i) a distance of movement of the vehicle from the current place to the destination and (ii) time taken for the vehicle to move from the current place to the destination to the minimum extent possible.

In addition, according to this aspect, the electronic control unit may be further configured determine at least one of the automatic control amounts to a larger amount when the electronic control unit executes the automatic movement control to cause the vehicle to move along the update movement route, compared with when the electronic control unit executes the automatic movement control to cause the vehicle to move along the optimal movement route.

When the vehicle is caused to move along the update movement route, the automatic movement control is executed. Thus, when the vehicle is caused to move along the update movement route, the movement of the vehicle with inputting the large control amount into at least one of the vehicle actuators may not render the occupants uneasy. In addition, when the large control amount is input into at least one of the vehicle actuators, a lot of the data on the vehicle behavior characteristics can be acquired. Thereby, the vehicle behavior characteristic data can be updated to accurately represent the actual vehicle behavior characteristics. Thus, with this aspect, the vehicle behavior characteristic data can be updated to accurately represent the actual vehicle behavior characteristics with preventing the occupants from feeling uneasy.

According to further another aspect of the disclosure, the turning actuator may include a motor driver for activating a steering motor for applying steering torque to a steering shaft.

According to further another aspect of the disclosure, the acceleration actuator may include a fuel injector actuator for activating a fuel injector for supplying fuel to a combustion chamber of an internal combustion engine.

According to further another aspect of the disclosure, the deceleration actuator may include a brake actuator for activating a brake mechanism for applying braking force to the vehicle.

According to further another aspect of the disclosure, the at least one sensor may include a yaw rate sensor for detecting a yaw rate of the vehicle. In addition, according to this aspect, the electronic control unit may be further configured to acquire the turning characteristic, based on the yaw rate detected by the yaw rate sensor.

According to further another aspect of the disclosure, the at least one sensor may include a lateral acceleration sensor for detecting a lateral acceleration of the vehicle. In addition, according to this aspect, the electronic control unit may be further configured to acquire the turning characteristic, based on the lateral acceleration detected by the lateral acceleration sensor.

According to further another aspect of the disclosure, the at least one sensor may include a yaw rate sensor for detecting a yaw rate of the vehicle and a lateral acceleration sensor for detecting a lateral acceleration of the vehicle. In addition, according to this aspect, the electronic control unit may be further configured to acquire the turning characteristic, based on the yaw rate detected by the yaw rate sensor and the lateral acceleration detected by the lateral acceleration sensor.

According to further another aspect of the disclosure, the at least one sensor may include a longitudinal acceleration sensor for detecting a longitudinal acceleration of the vehicle. In addition, according to this aspect, the electronic control unit may be further configured to acquire the acceleration characteristic, based on the longitudinal acceleration detected by the longitudinal acceleration sensor.

According to further another aspect of the disclosure, the at least one sensor may include a longitudinal acceleration sensor for detecting a longitudinal acceleration of the vehicle. In addition, according to this aspect, the electronic control unit may be further configured to acquire the deceleration characteristic, based on the longitudinal acceleration detected by the longitudinal acceleration sensor.

According to further another aspect of the disclosure, the at least one sensor may include a longitudinal acceleration sensor for detecting a longitudinal acceleration of the vehicle. In addition, according to this aspect, the electronic control unit may be further configured to acquire the acceleration characteristic and the deceleration characteristic, based on the longitudinal acceleration detected by the longitudinal acceleration sensor.

According to further another aspect of the disclosure, the electronic control unit may be further configured to execute a normal driving control to (i) determine the control amounts to be input into the vehicle actuators as normal control amounts, based on the driving operation by the driver and (ii) input the determined normal control amounts into the vehicle actuators when the execution of the automatic movement control is not requested.

The elements of the present disclosure are not limited to the elements of the embodiment defined by the reference symbols. The other objects, features and accompanied advantages of the present disclosure can be easily understood from the description of the embodiment of the present disclosure along with the drawings.

DETAILED DESCRIPTION

Figure 1:
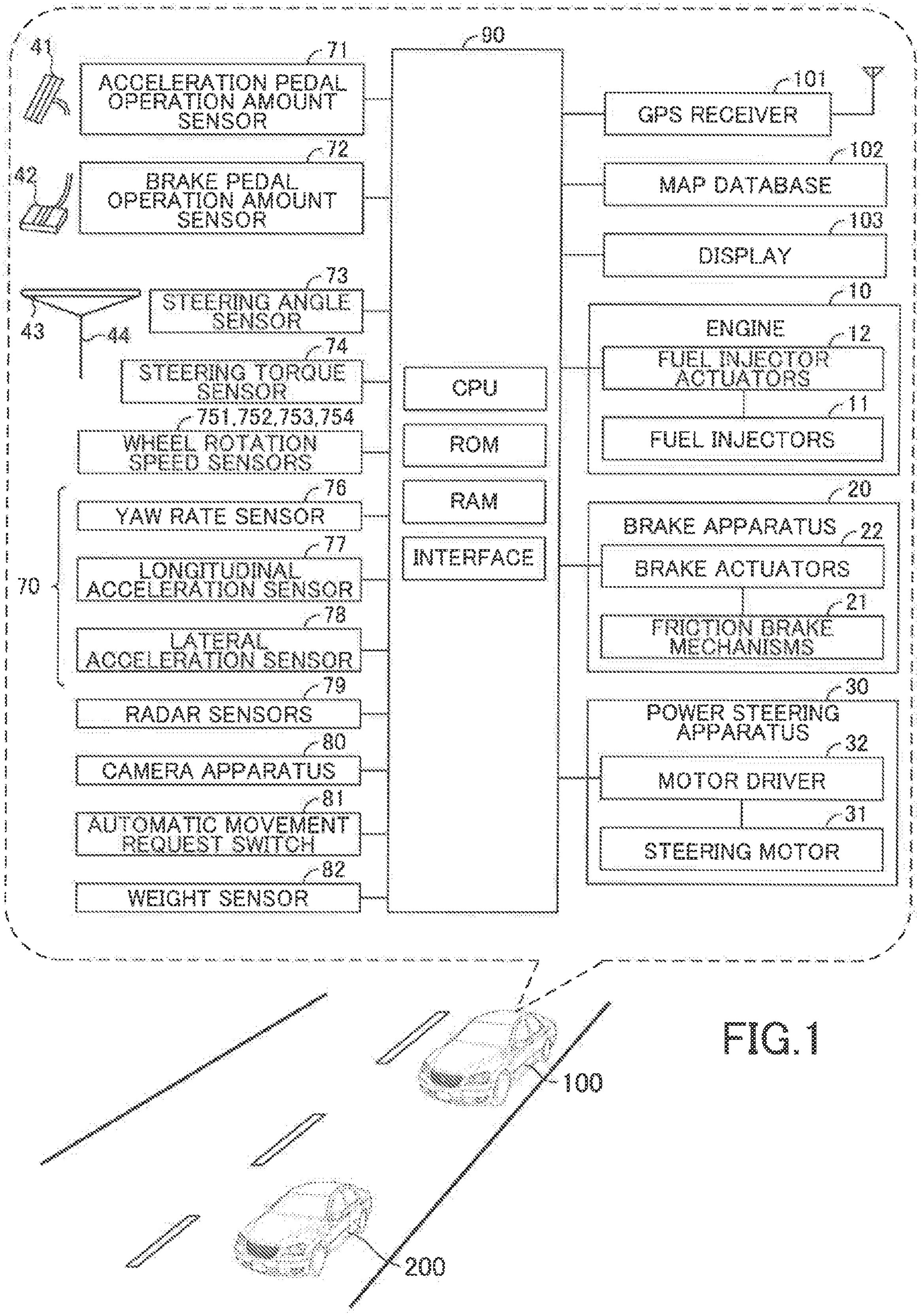
FIG. 1 is a view for showing a vehicle control apparatus including a vehicle movement control apparatus according to an embodiment of the present disclosure and a vehicle to which the control apparatus is applied.

Below, a vehicle control apparatus including a vehicle movement control apparatus according to an embodiment of the present disclosure will be described with reference to the drawings. The vehicle control apparatus according to the embodiment is applied to a vehicle 100 shown in FIG. 1. As shown in FIG. 2, the vehicle 100 includes four wheels 51 to 54. In particular, the vehicle 100 includes a left front wheel 51, a right front wheel 52, a left rear wheel 53, and a right rear wheel 54. It should be noted that the vehicle control apparatus according to the disclosure may be applied to a vehicle including the wheels of less or more than four. Hereinafter, the vehicle control apparatus according to the embodiment will be referred to as "the embodiment control apparatus".

The vehicle 100 includes an internal combustion engine 10 as a driving force source for supplying a driving force to the vehicle 100 for driving the vehicle 100. The vehicle control apparatus including the vehicle movement control apparatus according to the disclosure may be applied to a hybrid vehicle (HV) or a plug-in hybrid vehicle (PHV) including the internal combustion engine and at least one electric motor as the driving force source. Further, the vehicle control apparatus including the vehicle movement control apparatus according to the disclosure may be applied to an electric vehicle (EV) including at least one electric motor as the driving force source without including the internal combustion engine. Furthermore, the vehicle control apparatus including the vehicle movement control apparatus according to the disclosure may be applied to a fuel cell vehicle (FCV) including at least one electric motor as the driving force source and using electric power generated by fuel cells to drive the electric motor. Further, the vehicle control apparatus including the vehicle movement control apparatus according to the disclosure may be applied to an in-wheel motor type of a vehicle including motors provided to the wheels, respectively as the driving force sources for rotating the wheels.

Further, the vehicle 100 moves with occupant/occupants including a driver or with no occupant. The vehicle control apparatus including the vehicle movement control apparatus according to the disclosure may be applied to a vehicle having no space for the occupants and always caused to move automatically. In other words, the vehicle control apparatus including the vehicle movement control apparatus according to the disclosure may be applied to an unmanned vehicle.

Further, the disclosure may be applied to a vehicle provided with the vehicle control apparatus configured to execute a control for assisting a driving operation performed by the driver to cause the vehicle to move safely when the driver performs the driving operation for causing the vehicle to move. In particular, the disclosure may be applied to a vehicle provided with the vehicle control apparatus configured to execute a driving assist control such as (i) a contact prevention control for preventing the vehicle from contacting an object outside of the vehicle by automatically braking the vehicle and (ii) a vehicle lane deviation prevention control for preventing the vehicle from deviating from a vehicle lane by automatically steering the vehicle. An automatic movement control described later may include such driving assist controls.

Hereinafter, any of the wheels 51 to 54 will be referred to as "the wheel 50".

Figure 2:
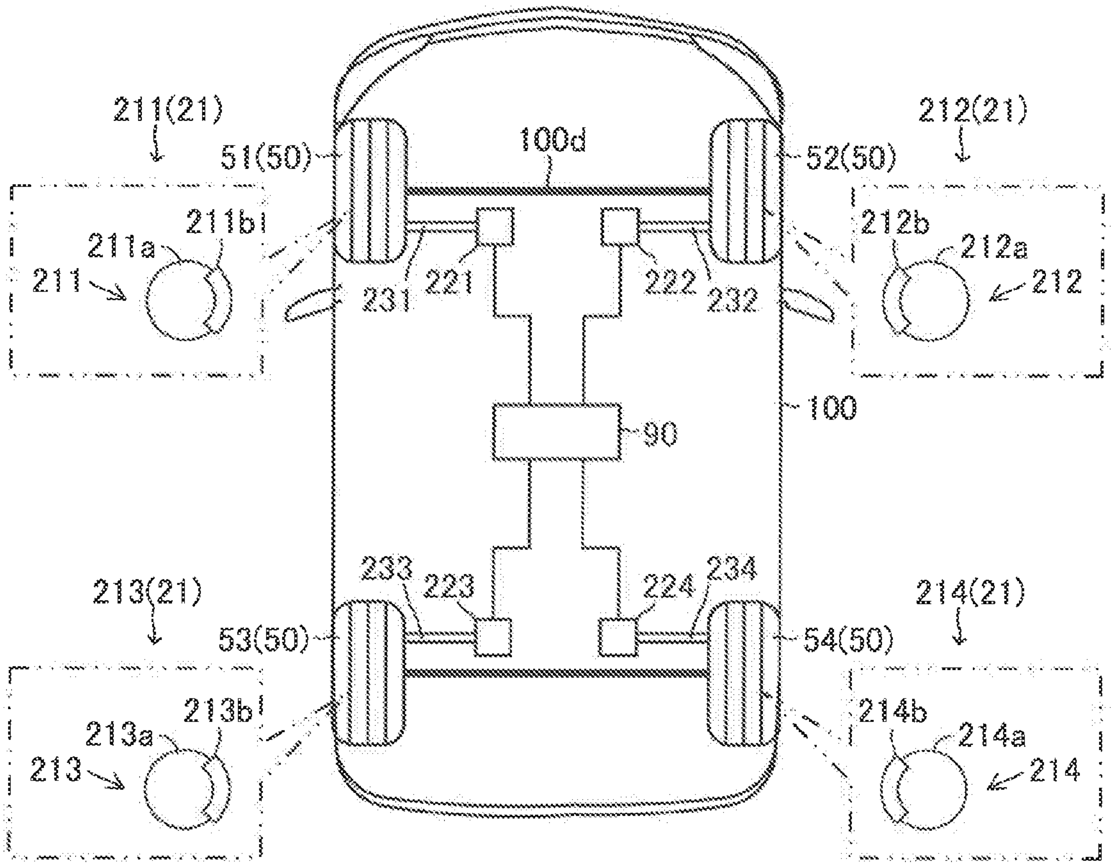
FIG. 2 is a view for showing a friction brake apparatus, etc. of the vehicle shown in FIG. 1.

As shown in FIG. 1, the embodiment control apparatus includes an ECU 90. The ECU stands for an electronic control unit. The ECU 90 includes a micro-computer as a main component. The micro-computer includes a CPU, a ROM, a RAM, a non-volatile memory, an interface, etc. The CPU is configured or programmed to realize various functions by executing instructions, programs, routines, etc. stored in the ROM.

As shown in FIG. 1, the vehicle 100 includes the internal combustion engine 10, a brake apparatus 20, a power steering apparatus 30.

<Internal Combustion Engine>

The engine 10 is a known compression ignition type of multi cylinder internal combustion engine, in particular, a so-called diesel engine. In this regard, the engine 10 may be a known spark ignition type of multi cylinder internal combustion engine, in particular, a so-called gasoline engine.

The engine 10 includes combustion chambers (not shown), fuel injectors 11 for injecting fuel into the combustion chambers, respectively, fuel injector actuators 12 for controlling activations of the fuel injectors 11, etc.

The fuel injector actuators 12 are electrically connected to the ECU 90. The ECU 90 controls activations of the fuel injector actuators 12 to control an amount of the fuel injected from each fuel injector 11. Thereby, the ECU 90 controls a torque generated by the engine 10. The torque generated by the engine 10 increases as the amount of the fuel injected from each fuel injector 11 increases. The torque generated by the engine 10 is transmitted to the left and right front wheels 51 and 52 via a transmission (not shown) and a drive shaft 100*d* (see FIG. 2). Hereinafter, the amount of the fuel injected from each fuel injector 11 will be referred to as "the fuel injection amount". Further, the torque generated by the engine 10 will be referred to as "the engine torque".

The ECU 90 activates the fuel injector actuators 12 by inputting control amounts into the fuel injector actuators 12. Thus, the ECU 90 controls the activations of the fuel injector actuators 12 by controlling the control amounts input into the fuel injector actuators 12. In this embodiment, as the control amounts input into the fuel injector actuators 12 increase, the fuel injection amount increases and as a result, the engine torque increases. Thus, as the control amounts input into the fuel injector actuators 12 increase, an acceleration of the vehicle 100 increases.

<Brake Apparatus>

The brake apparatus 20 is a known apparatus. As shown in FIG. 2, the brake apparatus 20 includes friction brake mechanisms 211 to 214, brake actuators 221 to 224, hydraulic oil passages 231 to 234, etc. The friction brake mechanisms 211 to 214 are provided, corresponding to the wheels 51 to 54 of the vehicle 100, respectively. The brake actuators 221 to 224 are provided, corresponding to the friction brake mechanisms 211 to 214, respectively. The hydraulic oil passages 231 to 234 are provided, corresponding to the brake actuators 221 to 224.

In the following description, any of the friction brake mechanisms 211 to 214 will be referred to as "the friction brake mechanism 21". Further, any of the brake actuators 221 to 224 will be referred to as "the brake actuator 22".

The friction brake mechanisms 211 to 214 include brake discs 211*a* to 214*a* and brake calipers 211*b* to 214*b*, respectively. The brake discs 211*a* to 214*a* are secured to the wheels 51 to 54, respectively. The brake calipers 211*b* to 214*b* are secured to a body of the vehicle 100.

The brake actuators 221 to 224 are fluidically connected to the brake calipers 211*b* to 214*b* of the friction brake mechanisms 211 to 214 through the hydraulic oil passages 231 to 234, respectively. The brake actuators 221 to 224 supply hydraulic oil compressed by a master cylinder (not shown) to the friction brake mechanisms 211 to 214 through the hydraulic oil passages 231 to 234, respectively. In particular, in this embodiment, the brake actuators 221 to 224 supply the hydraulic oil compressed by the master cylinder to the brake calipers 211*b* to 214*b* of the friction brake mechanisms 211 to 214 through the hydraulic oil passages 231 to 234, respectively.

When the hydraulic oil is supplied to the friction brake mechanisms 21, brake pads of the brake calipers 211*b* to 214*b* of the friction brake mechanisms 21 are pressed on the brake discs 211*a* to 214*a*, respectively. Thereby, braking force is applied to the wheels 50.

The brake actuators 22 are electrically connected to the ECU 90. The ECU 90 controls a pressure of the hydraulic oil supplied to the friction brake mechanisms 21 by controlling activations of the brake actuators 22. As the pressure of the hydraulic oil supplied to the friction brake mechanisms 21 increases, the braking force applied to the wheels 50 increases. Hereinafter, the pressure of the hydraulic oil supplied to the friction brake mechanisms 21 will be referred to as "the brake hydraulic pressure".

The ECU 90 activates the brake actuators 22 by inputting control amounts into the brake actuators 22. Thus, the ECU 90 controls the activations of the brake actuators 22 by controlling the control amounts input into the brake actuators 22. In this embodiment, as the control amount input into each brake actuator 22 increases, the brake pressure increases and as a result, the braking force applied to each wheel 50 increases. Thus, as the control amount input into each brake actuator 22 increases, a deceleration of the vehicle 100 increases.

<Power Steering Apparatus>

The power steering apparatus 30 is a known apparatus. As shown in FIG. 1, the power steering apparatus 30 includes a motor driver 32, a steering motor 31, etc. The motor driver 32 is electrically connected to the steering motor 31. The steering motor 31 generates a torque when electric power is supplied to the steering motor 31 from the motor driver 32. The steering motor 31 applies the generated torque to a steering shaft 44.

The motor driver 32 is electrically connected to the ECU 90. The ECU 90 controls an activation of the motor driver 32. The ECU 90 controls the torque applied from the steering motor 31 to the steering shaft 44 by controlling the activation of the motor driver 32.

The ECU 90 activates the motor driver 32 by inputting a control amount into the motor driver 32. Thus, the ECU 90 controls the activation of the motor driver 32 by controlling the control amount input into the motor driver 32. In this embodiment, as the control amount input into the motor driver 32 increases, the torque applied from the steering motor 31 to the steering shaft 44 increases and as a result, a degree that the vehicle 100 turns increases. Thus, as the control amount input into the motor driver 32 increases, the degree that the vehicle 100 turns increases.

<Sensors, Etc.>

The vehicle 100 is provided with an acceleration pedal operation amount sensor 71, a brake pedal operation amount sensor 72, a steering angle sensor 73, a steering torque sensor 74, wheel rotation speed sensors 751 to 754, a yaw rate sensor 76, a longitudinal acceleration sensor 77, a lateral acceleration sensor 78, radar sensors 79, a camera apparatus 80, an automatic movement request switch 81, a weight sensor 82, a GPS receiver 101, a map database 102, and a display 103.

The acceleration pedal operation amount sensor 71 is electrically connected to the ECU 90. The acceleration pedal operation amount sensor 71 detects an operation amount of an acceleration pedal 41 and sends a signal representing the detected operation amount to the ECU 90. The ECU 90 acquires the operation amount of the acceleration pedal 41 as an acceleration pedal operation amount AP, based on the signal sent from the acceleration pedal operation amount sensor 71.

The brake pedal operation amount sensor 72 is electrically connected to the ECU 90. The brake pedal operation amount sensor 72 detects an operation amount of a brake pedal 42 and sends a signal representing the detected operation amount to the ECU 90. The ECU 90 acquires the operation amount of the brake pedal 42 as a brake pedal operation amount BP, based on the signal sent from the brake pedal operation amount sensor 72.

The steering angle sensor 73 is electrically connected to the ECU 90. The steering angle sensor 73 detects a steering angle of any of the left and right front wheels 51 and 52 which are wheels-to-be-steered of the vehicle 100 and sends a signal representing the detected steering angle to the ECU 90. The ECU 90 acquires the steering angle of any of the left and right front wheels 51 and 52 as a steering angle $\theta st$, based on the signal sent from the steering angle sensor 73.

The steering torque sensor 74 is electrically connected to the ECU 90. The steering torque sensor 74 detects a torque applied to the steering shaft 44 by the driver operating a steering wheel 43 and sends a signal representing the detected torque to the ECU 90. The ECU 90 acquires the torque applied to the steering shaft 44 as a driver steering torque TQdriver, based on the signal sent from the steering torque sensor 74. In this embodiment, the driver steering torque TQdriver is greater than zero when the driver operates the steering wheel 43 to turn the vehicle 100 left. On the other hand, when the driver operates the steering wheel 43 to turn the vehicle 100 right, the driver steering torque TQdriver is smaller than zero.

The wheel rotation speed sensors 751 to 754 are electrically connected to the ECU 90. The wheel rotation speed sensors 751 to 754 detect rotation speeds of the wheels 50, respectively and send signals representing the detected rotation speeds to the ECU 90. The ECU 90 acquires the rotation speeds of the wheels 50 as wheel rotation speeds V1 to V4, based on the signals sent from the wheel rotation speed sensors 751 to 754.

The ECU 90 acquires an average Vave of the acquired wheel rotation speeds V1 to V4 ($Vave=(V1+V2+V3+V4)/4$) as a movement speed of the vehicle 100. Hereinafter, the movement speed of the vehicle 100 will be referred to as "the vehicle movement speed SPD".

The yaw rate sensor 76 is electrically connected to the ECU 90. The yaw rate sensor 76 detects a yaw rate of the vehicle 100 and sends a signal representing the detected yaw rate to the ECU 90. The ECU 90 acquires the yaw rate of the vehicle 100 as a yaw rate $\delta$, based on the signal sent from the yaw rate sensor 76.

The longitudinal acceleration sensor 77 is electrically connected to the ECU 90. The longitudinal acceleration sensor 77 detects a longitudinal acceleration of the vehicle 100 and sends a signal representing the detected longitudinal acceleration to the ECU 90. The ECU 90 acquires the longitudinal acceleration of the vehicle 100 as a longitudinal acceleration Gx, based on the signal sent from the longitudinal acceleration sensor 77.

The lateral acceleration sensor 78 is electrically connected to the ECU 90. The lateral acceleration sensor 78 detects a lateral acceleration of the vehicle 100, i.e., an acceleration of the vehicle 100 in a widthwise direction of the vehicle 100 and sends a signal representing the detected lateral acceleration to the ECU 90. The ECU 90 acquires the lateral acceleration of the vehicle 100 as a lateral acceleration Gy, based on the signal sent from the lateral acceleration sensor 78.

The radar sensors 79 are electrically connected to the ECU 90. Each radar sensor 79 emits radio waves of a millimeter wave band ahead of the vehicle 100. Each radar sensor 79 receives the radio waves reflected by a vehicle 200 moving ahead of the vehicle 100. Hereinafter, the radio wave emitted from each radar sensor 79 will be referred to as "the millimeter wave". Further, the radio wave reflected by the vehicle 200 moving ahead of the vehicle 100 will be referred to as "the reflected wave". Furthermore, the vehicle 200 moving ahead of the vehicle 100 will be referred to as "the preceding vehicle 200". Each radar sensor 79 sends signals representing (i) a difference in phase between the emitted millimeter wave and the received reflected wave, (ii) an attenuation level of the received reflected wave, (iii) time elapsing from emitting the millimeter wave to receive the reflected wave, etc. to the ECU 90. The ECU 90 acquires a distance between the preceding vehicle 200 and the vehicle 100 as an inter-vehicle distance D, based on the signals sent from the radar sensors 79.

The camera apparatus 80 is electrically connected to the ECU 90. The camera apparatus 80 includes at least one camera. The camera apparatus 80 takes a view ahead of the vehicle 100 by the at least one camera and acquires data on the taken view as image data. The camera apparatus 80 sends the image data to the ECU 90. The ECU 90 recognizes objects such as the preceding vehicle 200 and walking persons and acquires a relationship between the vehicle 100 and the objects, based on the image data. In addition, the ECU 90 recognizes a left lane marking LL and a right lane marking LR which defines a vehicle lane in which the vehicle 100 moves.

The automatic movement request switch 81 is electrically connected to the ECU 90. The automatic movement request switch 81 is operated by the driver of the vehicle 100. The driver may request an execution of the automatic movement control described later by setting the automatic movement request switch 81 at an ON position. When the automatic movement request switch 81 is set at the ON position by the driver, the ECU 90 determines that the execution of the automatic movement control is requested. On the other hand, when the automatic movement request switch 81 is set at an OFF position by the driver, the ECU 90 determines that the execution of the automatic movement control is not requested.

The weight sensor 82 is electrically connected to the ECU 90. The weight sensor 82 detects a weight of occupants including the driver in the vehicle 100 and sends a signal representing the detected weight. The ECU 90 determines whether there is the occupant in the vehicle 100, based on the signal sent from the weight sensor 82.

The GPS receiver 101, the map database 102, and the display 103 are electrically connected to the ECU 90.

The GPS receiver 101 receives GPS signals used for detecting a current position of the vehicle 100. The GPS receiver 101 sends the received GPS signals to the ECU 90. The map database 102 stores map information, etc. The display 103 is a touch panel type of a display which is a human machine interface.

The ECU 90 acquires the current position of the vehicle 100, based on the GPS signals sent from the GPS receiver 101. Further, the ECU 90 executes various calculation processes, based on (i) the current position of the vehicle 100, (ii) the map information stored in the map database 102, etc. and performs a route guidance, using the display 103.

<Summary of Operation of Embodiment Control Apparatus>

Next, a summary of an operation of the embodiment control apparatus will be described. The embodiment control apparatus is configured or programmed to execute the automatic movement control for automatically causing the vehicle 100 to move. The embodiment control apparatus sets a movement route from a current place to a previously-set destination as a target movement route Rtgt while executing the automatic movement control. Then, the embodiment control apparatus causes the vehicle 100 to move along the target movement route Rtgt by (i) automatically steering the vehicle 100 without an operation of steering the steering wheel 43 by the driver and (ii) automatically accelerating or decelerating the vehicle 100 without operations of operating the acceleration pedal 41 and the brake pedal 42 by the driver while executing the automatic movement control.

The driver, etc. can set the destination, for example, by operating icons indicated on the display 103.

The embodiment control apparatus executes the automatic movement control when the execution of the automatic movement control is requested. On the other hand, when the execution of the automatic movement control is not requested, the embodiment control apparatus executes a normal driving control including (i) a normal steering control and (ii) a normal acceleration-and-deceleration control. Below, the normal steering control and the normal acceleration-and-deceleration control will be described first. Then, the automatic movement control will be described.

<Normal Steering Control>

When the execution of the automatic movement control is not requested, the embodiment control apparatus executes the normal steering control to control the activation of the steering motor 31 to apply the torque for assisting the driver's operation of operating the steering wheel 43 from the steering motor 31 to the steering shaft 44. The embodiment control apparatus determines the torque applied from the steering motor 31 to the steering shaft 44, based on the driver steering torque TQdriver.

<Normal Acceleration-and-Deceleration Control>

In addition, when the execution of the automatic movement control is not requested, the embodiment control apparatus executes the normal acceleration-and-deceleration control for accelerating and decelerating the vehicle 100, based on the acceleration pedal operation amount AP and the brake pedal operation amount BP.

When the acceleration pedal operation amount AP is greater than zero in executing the normal acceleration-and-deceleration control, the embodiment control apparatus sets a target fuel injection amount Qtgt to an amount greater than zero. The target fuel injection amount Qtgt increases as the acceleration pedal operation amount AP increases. In addition, the target fuel injection amount Qtgt increases as the vehicle movement speed SPD increases. On the other hand, when the acceleration pedal operation amount AP is zero in executing the normal acceleration-and-deceleration control, the embodiment control apparatus sets the target fuel injection amount Qtgt to zero, independently of the vehicle movement speed SPD. Then, the embodiment control apparatus controls the activations of the fuel injector actuators 12 to inject the fuel of the target fuel injection amount Qtgt from the fuel injectors 11.

When the brake pedal operation amount BP is greater than zero in executing the normal acceleration-and-deceleration control, the embodiment control apparatus sets a target brake hydraulic pressure Poil_tgt to a pressure greater than zero. The target brake hydraulic pressure Poil_tgt increases as the brake pedal operation amount BP increases. On the other hand, when the brake pedal operation amount BP is zero in executing the normal acceleration-and-deceleration control, the embodiment control apparatus sets the target brake hydraulic pressure Poil_tgt to zero. Then, the embodiment control apparatus controls the activations of the brake actuators 22 to apply the brake hydraulic pressures of the target brake hydraulic pressure Poil_tgt to the friction brake mechanisms 21.

<Automatic Movement Control>

The embodiment control apparatus stores a vehicle turning model as one of vehicle behavior models. The vehicle turning model represents a turning characteristic of the vehicle 100 with the control amount being input into the motor driver 32. The vehicle turning model corresponds to vehicle behavior characteristic data on a relationship between the control amount input into the motor driver 32 and the turning characteristic of the vehicle 100 derived from inputting the control amount into the motor driver 32. The motor driver 32 is a turning actuator for turning the vehicle 100. The turning characteristic is one of the behavior characteristics of the vehicle 100.

In addition, the embodiment control apparatus stores a vehicle acceleration model as one of the vehicle behavior models. The vehicle acceleration model represents an acceleration characteristic of the vehicle 100 with the control amounts being input into the fuel injector actuators 12. The vehicle acceleration model corresponds to the vehicle behavior characteristic data on a relationship between the control amounts input into the fuel injector actuators 12 and the acceleration characteristic of the vehicle 100 derived from inputting the control amounts into the fuel injector actuators 12. The fuel injector actuators 12 are acceleration actuators for accelerating the vehicle 100. The acceleration characteristic is one of the behavior characteristics of the vehicle 100.

In addition, the embodiment control apparatus stores a vehicle deceleration model as one of the vehicle behavior models. The vehicle deceleration model represents a deceleration characteristic of the vehicle 100 with the control amounts being input into the brake actuators 22. The vehicle deceleration model corresponds to the vehicle behavior characteristic data on a relationship between the control amounts input into the brake actuators 22 and the deceleration characteristic of the vehicle 100 derived from inputting the control amounts into the brake actuators 22. The brake actuators 22 are deceleration actuators for decelerating the vehicle 100. The deceleration characteristic is one of the behavior characteristics of the vehicle 100.

The embodiment control apparatus uses (i) the vehicle turning model, (ii) the vehicle acceleration model, and (iii) the vehicle deceleration model in executing the automatic movement control to calculate the control amounts to be input into the motor driver 32, the fuel injector actuators 12, and the brake actuators 22 for causing the vehicle 100 to move along the target movement route Rtgt with observing traffic rules and preventing the vehicle 100 from contacting the objects such as the preceding vehicle 200 and the walking persons around the vehicle 100.

In order to cause the vehicle 100 to move along the target movement route Rtgt with observing traffic rules and preventing the vehicle 100 from contacting the objects around the vehicle 100, the vehicle behavior models including (i) the vehicle turning model, (ii) the vehicle acceleration model, and (iii) the vehicle deceleration model should represent the turning characteristic, the acceleration characteristic, and the deceleration characteristic of the vehicle 100 accurately.

In this regard, the vehicle behavior models may not represent the turning characteristic, the acceleration characteristic, and the deceleration characteristic of the vehicle 100 accurately due to (i) degradation over time of the motor driver 32, the fuel injector actuators 12, and the brake actuators 22, (ii) a condition of a road on which the vehicle 100 moves, etc.

The embodiment control apparatus determines whether updating of parameters in the vehicle behavior models is needed. Hereinafter, the parameters in the vehicle behavior models will be referred to as "the model parameters".

In other words, the embodiment control apparatus determines whether an update condition is satisfied. The update condition is satisfied when (i) the execution of the automatic control is requested, and (ii) the updating of the model parameters is needed. When the embodiment control apparatus determines that the update condition is not satisfied, the embodiment control apparatus acquires an optimal movement route Ropt. The optimal movement route Ropt is the movement route which shortens (i) a movement distance of the vehicle from the current place to the destination and (ii) time taken for the vehicle to move from the current place to the destination to a possible extent. The embodiment control apparatus sets the optimal movement route Ropt as the target movement route Rtgt.

Figure 3:
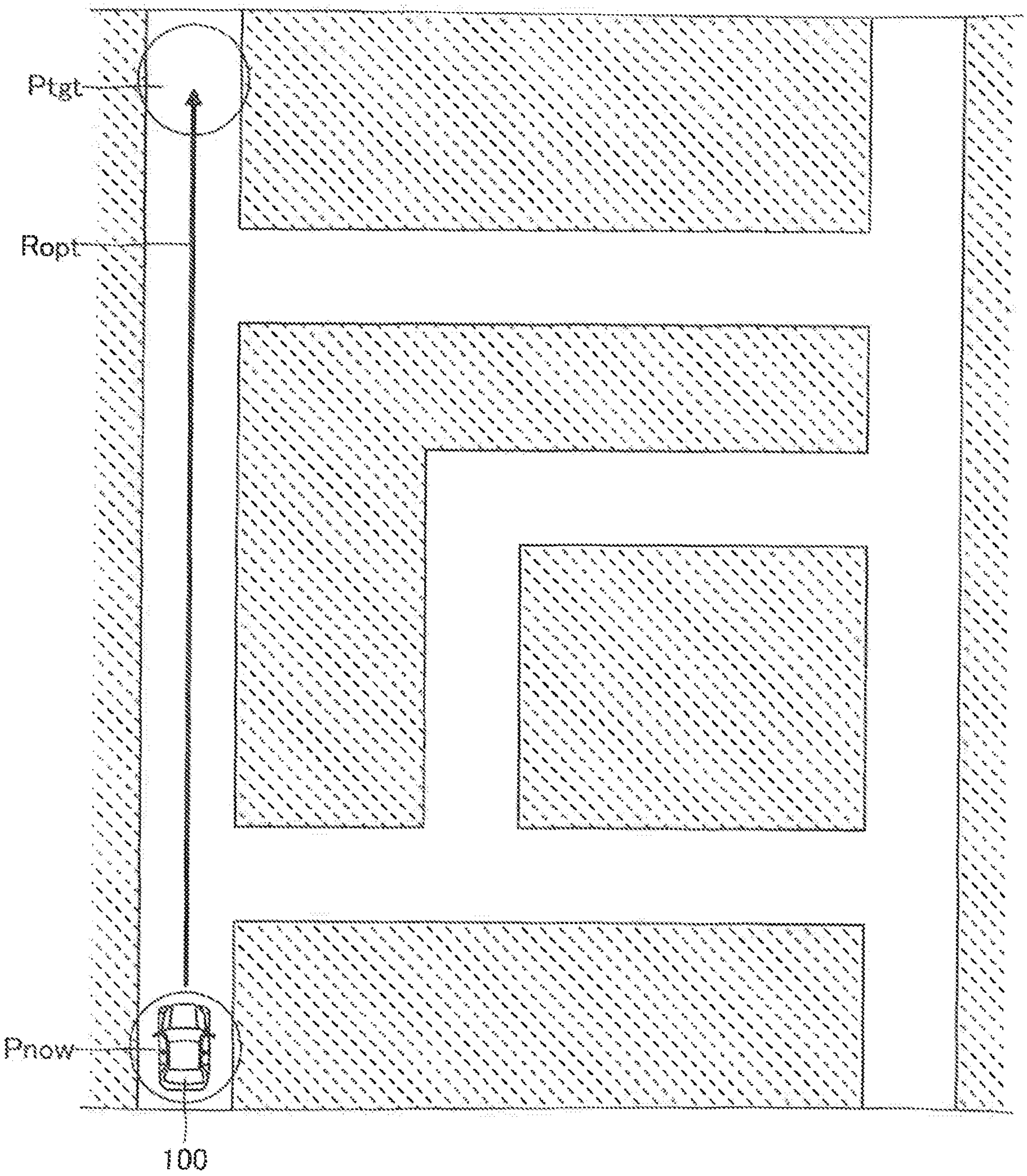
FIG. 3 is a view used for describing a process to set a target movement route.
Figure 4:
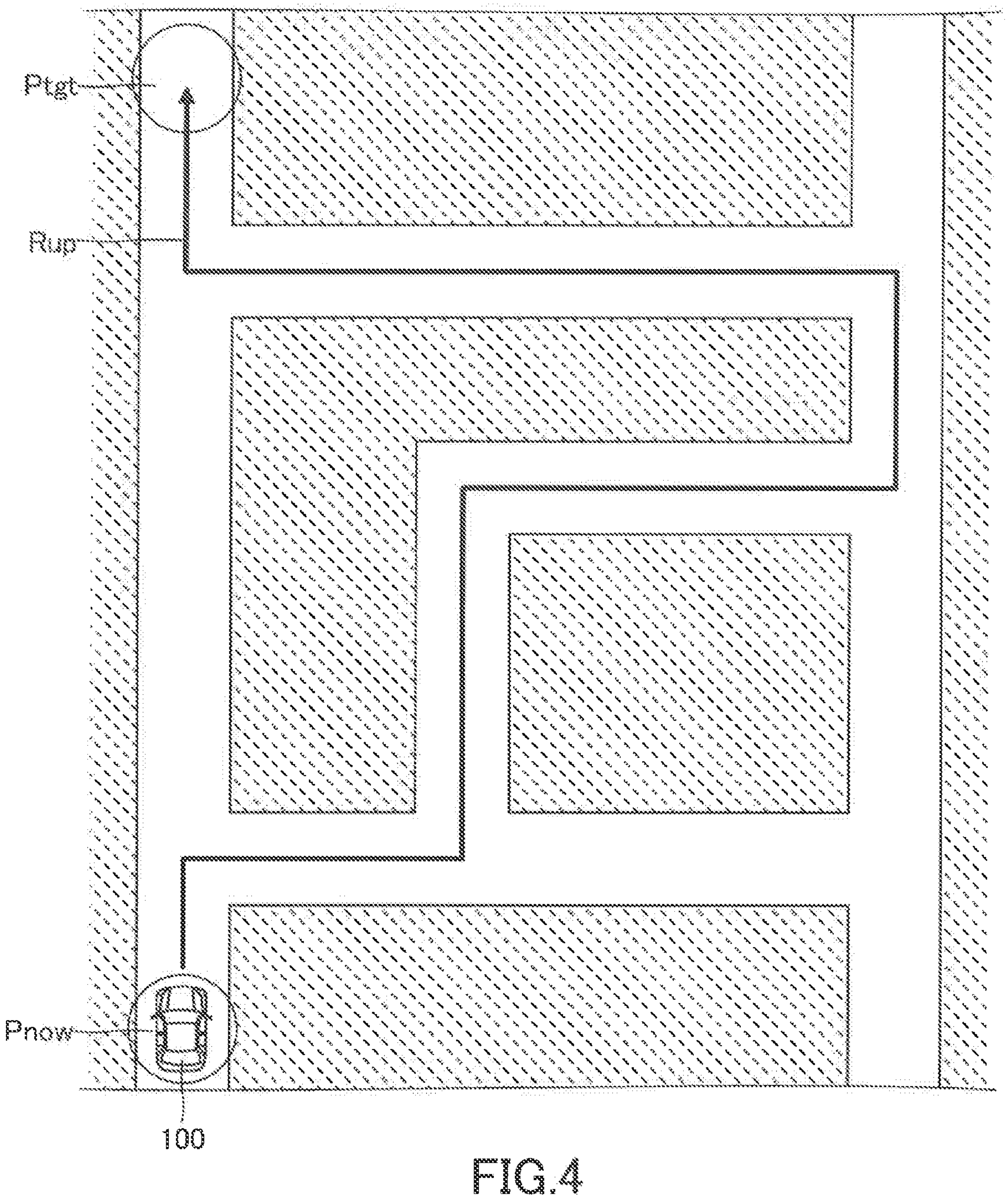
FIG. 4 is a view used for describing the process to set the target movement route.

For example, when the embodiment control apparatus causes the vehicle 100 to move from the current place Pnow to the destination Ptgt shown in FIG. 3, the movement route for causing the vehicle 100 to move straight from the current place Pnow to the destination Ptgt is the optimal movement route Ropt. In this case, the embodiment control apparatus sets such an optimal movement route Ropt as the target movement route Rtgt. The embodiment control apparatus causes the vehicle 100 to move along the target movement route Rtgt corresponding to the optimal movement route Ropt to the destination Ptgt.

When the embodiment control apparatus executes the automatic movement control, the embodiment control apparatus determines the control amounts to be input into the motor driver 32, the fuel injector actuators 12, and the brake actuators 22 for causing the vehicle 100 to move along the target movement route Rtgt with observing traffic rules and preventing the vehicle 100 from contacting the objects around the vehicle 100, based on (i) the steering angle θst, (ii) the vehicle movement speed SPD, (iii) the inter-vehicle distance D, (iv) the information on the objects, (v) the relationship between the vehicle 100 and the objects, (vi) the left and right lane markings LL and LR which defines the vehicle lane in which the vehicle 100 moves, etc.

On the other hand, when the embodiment control apparatus determines that the update condition is satisfied, the embodiment control apparatus acquires an update movement route Rup. The update movement route Rup is the movement route which leads to the turning, the acceleration, and the deceleration of the vehicle 100 suitable for recognizing the vehicle behavior characteristics including (i) the turning characteristic of the vehicle 100, (ii) the acceleration characteristic of the vehicle 100, and (iii) the deceleration characteristic of the vehicle 100.

In other words, the embodiment control apparatus acquires the update movement route Rup corresponding to the movement route which leads to (i) the turning of the vehicle 100 at a predetermined yaw rate δ for a predetermined time, (ii) the acceleration or the deceleration of the vehicle 100 with a predetermined longitudinal acceleration Gx for a predetermined time, and (iii) the turning of the vehicle 100 with a predetermined lateral acceleration Gy for a predetermined time.

The embodiment control apparatus sets the update movement route Rup as the target movement route Rtgt. The target movement route Rtgt corresponding to the update movement route Rup is not always the movement route which shortens (i) the movement distance of the vehicle from the current place to the destination and (ii) the time taken for the vehicle to move from the current place to the destination to the possible extent.

For example, when the vehicle 100 moves along the movement route corresponding to the optimal movement route Ropt shown in FIG. 3, the vehicle 100 does not turn. In this case, data on the turning characteristic of the vehicle 100, in particular, data on the yaw rate δ and the lateral acceleration Gy of the vehicle 100 cannot be acquired. In addition, the vehicle 100 may not be accelerated or decelerated. In this case, data on the acceleration and deceleration characteristics of the vehicle 100, in particular, the longitudinal acceleration Gx of the vehicle 100 cannot be acquired.

The embodiment control apparatus acquires the update movement route Rup corresponding to the movement route for causing the vehicle 100 to move straight and turn left and right from the current place Pnow to the destination Ptgt. The embodiment control apparatus sets the update movement route Rup as the target movement route Rtgt. The embodiment control apparatus causes the vehicle 100 to move along the target movement route Rtgt corresponding to the update movement route Rup to the destination Ptgt.

The embodiment control apparatus acquires the vehicle behavior characteristics, based on vehicle behavior parameters including (i) the yaw rate δ, (ii) the longitudinal acceleration Gx, and (iii) the lateral acceleration Gy acquired while executing the automatic movement control to cause the vehicle 100 to move along the target movement route Rtgt corresponding to the update movement route Rup. Then, the embodiment control apparatus updates the model parameters, based on the acquired vehicle behavior characteristics such that the vehicle behavior modes represents the actual vehicle behavior characteristics.

The driver does not need to operate the steering wheel 43, the acceleration pedal 41, and the brake pedal 42 when the automatic movement control is executed. In other words, all of processes for causing the vehicle 100 to move including a process for setting the target movement route are executed by the embodiment control apparatus, not by the driver. Thus, the occupants in the vehicle 100 are unlikely to feel uneasy even when the vehicle 100 moves along the update movement route Rup different from the optimal movement route Ropt.

Assuming that movement environments and movement conditions are the same, the control amounts input into vehicle actuators 12, 22, and 32 which are the fuel injector actuators 12, the brake actuators 22, and the motor driver 32 in causing the vehicle 100 to move along the update movement route Rup, are the same as the control amounts input into the vehicle actuators 12, 22, and 32 in causing the vehicle 100 to move along the optimal movement route Ropt. Thus, assuming that the movement environments and the movement conditions are the same, the turning, the acceleration, and the deceleration of the vehicle 100 in causing the vehicle 100 to move along the update movement route Rup, are the same as the turning, the acceleration, and the deceleration of the vehicle 100 in causing the vehicle 100 to move along the optimal movement route Ropt. In view of this point, the occupants in the vehicle 100 are unlikely to feel uneasy.

In addition, the update movement route Rup is the movement route suitable for causing the vehicle 100 to move with behaviors suitable for updating the model parameters. Thus, the model parameters can be updated appropriately.

Therefore, according to the embodiment control apparatus, the model parameters can be updated appropriately with preventing the occupants in the vehicle 100 from feeling uneasy.

Suitable data on the vehicle behavior parameters may not be acquired when the vehicle 100 moves on the uneven road, the aslope road, and the road crowded with vehicles. Thus, the movement environments including the uneven road, the aslope road, and the road crowded with the vehicles are not suitable for acquiring the suitable data on the vehicle behavior parameters. Accordingly, the embodiment control apparatus may be configured to acquire the update movement route Rup corresponding to the movement route which avoids the inappropriate movement environments.

Alternatively, the embodiment control apparatus may be configured to determine the control amounts leading to the appropriate data on the vehicle behavior parameters, depending on the movement environments as the control amounts input into the vehicle actuators 12, 22, and 32 when the embodiment control apparatus acquires the update movement route Rup corresponding to the movement route which passes the inappropriate environments.

<Concrete Operation of Embodiment Control Apparatus>

Figure 5:
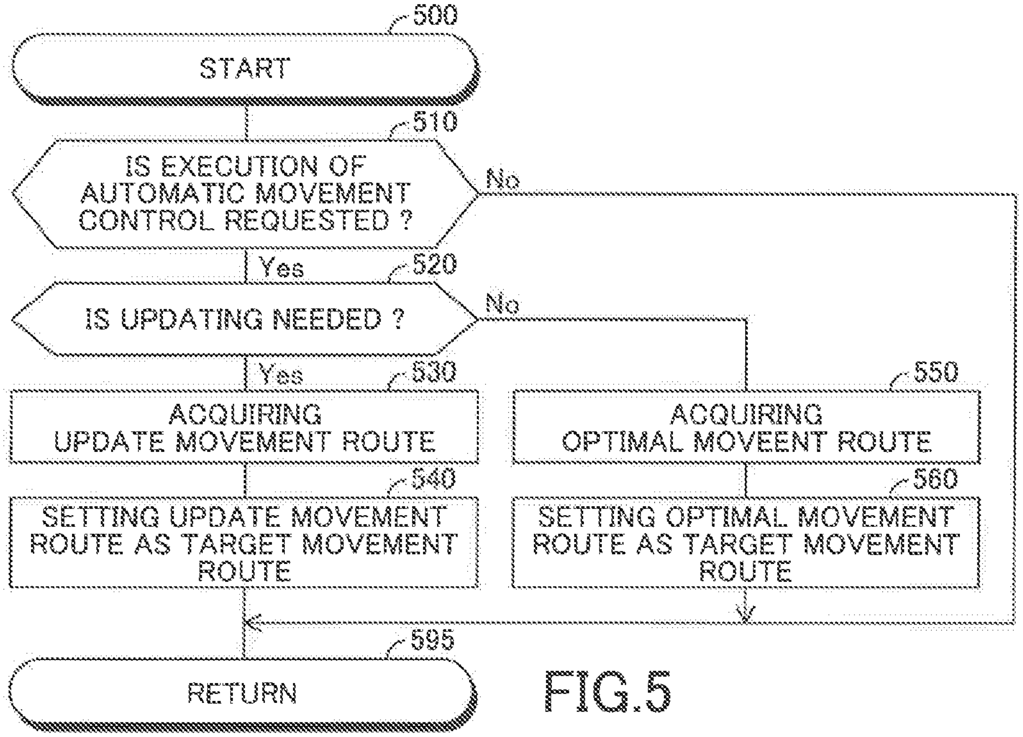
FIG. 5 is a view for showing a flowchart of a routine executed by a CPU of an ECU shown in FIG. 1.

Next, a concrete operation of the embodiment control apparatus will be described. The CPU of the ECU 90 of the embodiment control apparatus is configured or programmed to execute a routine shown by a flowchart in FIG. 5 each time a predetermined time elapses. Therefore, at a predetermined timing, the CPU starts a process from a step 500 in FIG. 5 and then, proceeds with the process to a step 510 to determine whether the execution of the automatic movement control is requested.

When the execution of the automatic movement control is requested, the CPU determines "Yes" at the step 510 and then, proceeds with the process to a step 520 to determine whether the updating of the model parameters is needed.

When the updating of the model parameters is needed, the CPU determines "Yes" at the step 520 and then, sequentially executes processes of steps 530 and 540 described below. Then, the CPU proceeds with the process to a step 595 to terminate this routine once.

Step 530: The CPU acquires the update movement route Rup.

Step 540: The CPU sets the update movement route Rup acquired at the step 530 as the target movement route Rtgt.

On the other hand, when the updating of the model parameters is not needed, the CPU determines "No" at the step 520 and then, sequentially executes processes of steps 550 and 560 described below. Then, the CPU proceeds with the process to the step 595 to terminate this routine once.

Step 550: The CPU acquires the optimal movement route Ropt.

Step 560: The CPU sets the optimal movement route Ropt acquired at the step 550 as the target movement route Rtgt.

When the execution of the automatic movement control is not requested at a time of executing a process of the step 510, the CPU determines "No" at the step 510 and then, proceeds with the process to the step 595 to terminate this routine once.

Figure 6:
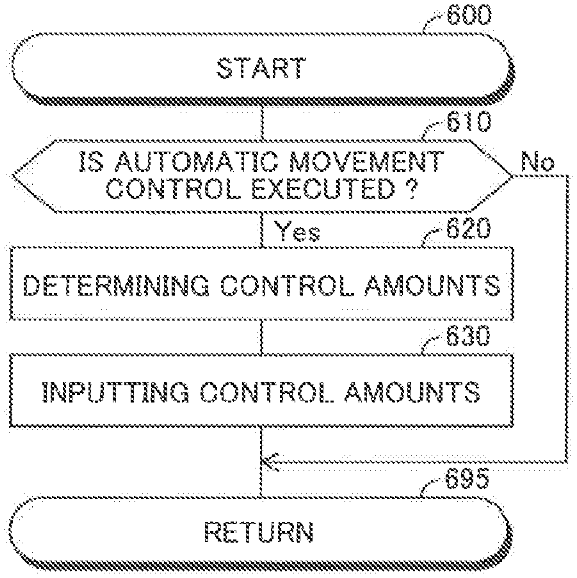
FIG. 6 is a view for showing a flowchart of a routine executed by the CPU.

Further, the CPU is configured or programmed to execute a routine shown by a flowchart in FIG. 6 each time the predetermined time elapses. Therefore, at a predetermined timing, the CPU starts a process from a step 600 in FIG. 6 and then, proceeds with the process to a step 610 to determine whether the automatic movement control is executed.

When the automatic movement control is executed, the CPU determines "Yes" at the step 610 and then, sequentially executes processes of steps 620 and 630 described below. Then, the CPU proceeds with the process to a step 695 to terminate this routine once.

Step 620: The CPU determines or sets the control amounts to be input into the vehicle actuators 12, 22, and 32 for causing the vehicle 100 to move along the target movement route Rtgt corresponding to the update movement route Rup with observing the traffic rules and preventing the vehicle 100 from contacting the objects around the vehicle 100.

Step 630: The CPU inputs the control amounts determined at the step 620 into the vehicle actuators 12, 22, and 32.

On the other hand, when the automatic movement control is not executed, the CPU determines "No" at the step 610 and then, proceeds with the process to the step 695 to terminate this routine once.

Figure 7:
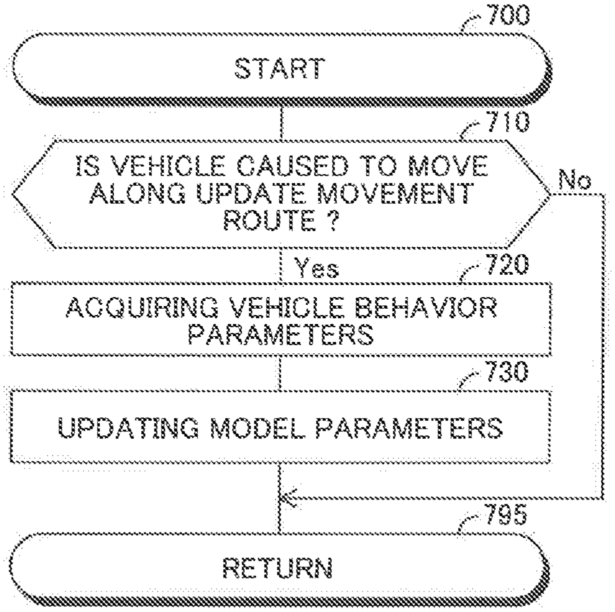
FIG. 7 is a view for showing a flowchart of a routine executed by the CPU.

Further, the CPU is configured or programmed to execute a routine shown by a flowchart in FIG. 7 each time the predetermined time elapses. Therefore, at a predetermined timing, the CPU starts a process from a step 700 in FIG. 7 and then, proceeds with the process to a step 710 to determine whether the vehicle 100 is caused to move along the target movement route Rtgt corresponding to the update movement route Rup.

When the vehicle 100 is caused to move along the target movement route Rtgt corresponding to the update movement route Rup, the CPU determines "Yes" at the step 710 and then, sequentially executes processes of steps 720 and 730 described below. Then, the CPU proceeds with the process to a step 795 to terminate this routine once.

Step 720: The CPU acquires data on the predetermined vehicle behavior parameters such as the yaw rate δ, the longitudinal acceleration Gx, and the lateral acceleration Gy.

Step 730: The CPU updates the model parameters, based on the data acquired at the step 720.

On the other hand, when the vehicle 100 is not caused to move along the target movement route Rtgt corresponding to the update movement route Rup, the CPU determines "No" at the step 710 and then, proceeds with the process to the step 795 to terminate this routine once.

The concrete operation of the embodiment control apparatus has been described. According to the embodiment control apparatus executing the routines shown in FIG. 5 and FIG. 7, the model parameters can be updated with preventing the occupants in the vehicle 100 from feeling uneasy.

It should be noted that the present disclosure is not limited to the aforementioned embodiment and various modifications can be employed within the scope of the present disclosure.

For example, the embodiment control apparatus may be configured to set the larger control amounts to be input into the vehicle actuators 12, 22, and 32 when the embodiment control apparatus executes the automatic movement control to cause the vehicle 100 to move along the update movement route Rup with no occupant, compared with when the embodiment control apparatus executes the automatic movement control to cause the vehicle 100 to move along the same update movement route Rup with the occupants.

Figure 8:
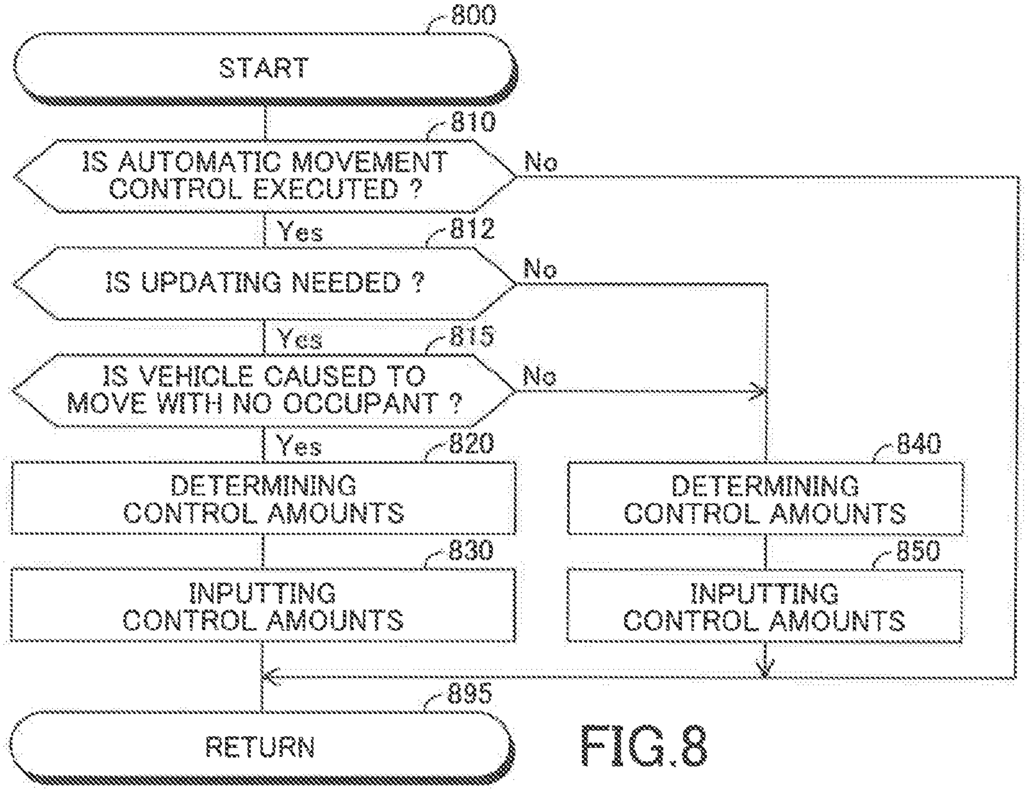
FIG. 8 is a view for showing a flowchart of a routine executed by the CPU.

The CPU of the ECU 90 of the vehicle movement control apparatus according to a modified example of the embodiment configured as such is configured or programmed to execute a routine shown by a flowchart in FIG. 8 each time the predetermined time elapses in place of the routine shown in FIG. 6. Hereinafter, the vehicle movement control apparatus according to the modified example will be referred to as "the modified control apparatus".

Therefore, at a predetermined timing, the CPU of the ECU 90 of the modified control apparatus starts a process from a step 800 in FIG. 8 and then, proceeds with the process to a step 810 to determine whether the automatic movement control is executed.

When the automatic movement control is executed, the CPU determines "Yes" at the step 810 and then, proceeds with the process to a step 812 to determine whether the updating of the model parameters is needed.

When the updating of the model parameters is needed, the CPU determines "Yes" at the step 812 and then, proceeds with the process to a step 815 to determine whether the vehicle 100 is caused to move with no occupant.

When the vehicle 100 is caused to move with no occupant, the CPU determines "Yes" at the step 815 and then, sequentially executes processes of steps 820 and 830 described below. Then, the CPU proceeds with the process to a step 895 to terminate this routine once.

Step 820: The CPU determines or sets the control amounts to be input into the vehicle actuators 12, 22, and 32 for causing the vehicle 100 to move along the target movement route Rtgt corresponding to the update movement route Rup with observing the traffic rules and preventing the vehicle 100 from contacting the objects around the vehicle 100.

Step 830: The CPU inputs the control amounts determined at the step 820 into the vehicle actuators 12, 22, and 32, respectively On the other hand, when the vehicle 100 is caused to move with the occupants, the CPU determines "No" at the step 815 and then, sequentially executes processes of steps 840 and 850 described below. Then, the CPU proceeds with the process to the step 895 to terminate this routine once.

Step 840: The CPU determines or sets the control amounts to be input into the vehicle actuators 12, 22, and 32 for causing the vehicle 100 to move along the target movement route Rtgt corresponding to the update movement route Rup with observing the traffic rules and preventing the vehicle 100 from contacting the objects around the vehicle 100. The control amounts determined at the step 840 are smaller than the control amounts determined at the step 820 in causing the vehicle 100 to move along the target movement route Rtgt corresponding to the same update movement route Rup.

Step 850: The CPU inputs the control amounts determined at the step 840 into the vehicle actuators 12, 22, and 32.

When the updating of the model parameters is not needed at a time of executing a process of the step 812, the CPU determines "No" at the step 812 and then, sequentially executes the processes of the steps 840 and 850 described above. Then, the CPU proceeds with the process to the step 895 to terminate this routine once.

When the automatic movement control is not executed at a time of executing a process of the step 810, the CPU determines "No" at the step 810 and then, proceeds with the process to the step 895 to terminate this routine once.

There is no occupant in the vehicle 100 when the vehicle 100 with no occupant moves along the update movement route Rup different from the optimal movement route Ropt. Thus, according to the modified control apparatus, the model parameters can be updated appropriately with preventing the occupants from feeling uneasy.

Further, there is no occupant in the vehicle 100 in causing the vehicle 100 with no occupant to move along the update movement route Rup with inputting the large control amounts into the vehicle actuators 12, 22, and 32. When the large control amounts are input into the vehicle actuators 12, 22, and 32, a lot of the data on the turning, acceleration, and deceleration characteristics of the vehicle 100 can be acquired. In this case, the vehicle behavior models can be updated so as to represent the actual behavior of the vehicle 100 accurately. Thus, the vehicle behavior models can be updated so as to represent the actual behavior of the vehicle 100 accurately with preventing the occupants from feeling uneasy.

In order to acquire the appropriate data on the vehicle behavior parameters by causing the vehicle 100 to move along the update movement route Rup, the sensors for detecting the vehicle behavior parameters, in particular, in this embodiment, the yaw rate sensor 76, the longitudinal acceleration sensor 77, and the lateral acceleration sensor 78 should detect the vehicle behavior parameters accurately.

Accordingly, the modified control apparatus may be configured to determine whether vehicle behavior sensors 70 which are the sensors for detecting the vehicle behavior parameters, detect the vehicle behavior parameters accurately when executing the automatic movement control to cause the vehicle 100 to move with no occupant.

In this case, for example, the modified control apparatus estimates a gradient of the road on which the vehicle 100 moves, based on the signal output from the longitudinal acceleration sensor 77 for determining whether the longitudinal acceleration sensor 77 detects the longitudinal acceleration Gx accurately when the vehicle 100 moves on the road having a known gradient. Then, the modified control apparatus determines that the longitudinal acceleration sensor 77 detects the longitudinal acceleration Gx accurately when the estimated gradient corresponds to the known gradient or when a difference between the estimated gradient and the known gradient is equal to or smaller than a predetermined value.

On the other hand, when the estimated gradient does not correspond to the known gradient or when the difference between the estimated gradient and the known gradient is greater than the predetermined value, the modified control apparatus determines that the longitudinal acceleration sensor 77 does not detect the longitudinal acceleration Gx accurately.

The predetermined value may be set to a value capable of determining appropriately whether the vehicle behavior sensors 70 detect the vehicle behavior parameters accurately, based on a vehicle movement environment information such as map information which can be acquired by wireless communication.

The modified control apparatus may be configured to correct the acquired vehicle behavior parameters so as to represent the actual vehicle behavior parameters, based on the signals output from the vehicle behavior sensors 70 when the vehicle behavior sensors 70 do not detect the vehicle behavior parameters accurately.

Further, the embodiment control apparatus sets the update movement route Rup as the target movement route Rtgt in executing the automatic movement control when the update condition is satisfied, i.e., when (i) the execution of the automatic movement control is requested, and (ii) the updating of the model parameters is needed. In this regard, the update condition may be satisfied when (i) the execution of the automatic movement control is requested, (ii) the updating of the model parameters is needed, and (iii) there is no occupant in the vehicle 100. In this case, the embodiment control apparatus sets the optimal movement route Ropt as the target movement route Rtgt when (i) the execution of the automatic movement control is requested, (ii) the updating of the model parameters is needed, and (iii) there is no occupant in the vehicle 100.

Further, the update condition may be satisfied when (i) the execution of the automatic movement control is requested, and (ii) there is no occupant in the vehicle 100, independently of whether the updating of the model parameters is needed. In this case, the embodiment control apparatus sets the optimal movement route Ropt as the target movement route Rtgt when (i) the execution of the automatic control is requested, and (ii) there is the occupant in the vehicle 100.

The update condition may be satisfied when the execution of the automatic movement control is requested, independently of whether the updating of the model parameters is needed, and there is no occupant in the vehicle 100. In this case, the embodiment control apparatus may be configured to set the larger control amounts to be input into the vehicle actuators 12, 22, and 32 when the vehicle 100 is caused to move along the update movement route Rup with no occupant in executing the automatic movement control, compared with when the vehicle 100 is caused to move along the same update movement route Rup with the occupants.

Further, the embodiment control apparatus and the modified control apparatus do not acquire the data on the vehicle behavior parameters and as a result, do not update the model parameters in executing the normal driving control including (i) the normal steering control and (ii) the normal acceleration-and-deceleration control. In this regards, the embodiment control apparatus may be configured to acquire the data on the vehicle behavior parameters and update the model parameters when the vehicle 100 moves with executing the normal driving control. In this case, the embodiment control apparatus may be configured to set the larger control amounts to be input into the vehicle actuators 12, 22, and 32 when the vehicle 100 is caused to move along the update movement route Rup in executing the automatic movement control, compared with when the vehicle 100 moves along the same movement route as the update movement route Rup in executing the normal driving control.

Further, the automatic movement control is executed when the vehicle 100 moves along the update movement route Rup. Thus, the occupants are unlikely to feel uneasy in causing the vehicle 100 to move along the update movement route Rup even when the large control amounts are input into the vehicle actuators 12, 22, and 32. When the large control amounts are input into the vehicle actuators 12, 22, and 32, a lot of the data on the vehicle behavior characteristics. In this case, the vehicle behavior models may be updated so as to represent the actual vehicle behavior models accurately. Therefore, the vehicle behavior models can be updated so as to represent the actual vehicle behavior models accurately with preventing the occupants from feeling uneasy.

What is claimed is:

1. A vehicle movement control method of executing an automatic movement control to cause a vehicle to move from a current position to a destination along a target movement route without a driving operation for driving the vehicle by a driver of the vehicle, wherein the vehicle movement control method comprises steps of:

(i) memorizing a relationship between control amounts input into vehicle actuators and vehicle behavior characteristics derived from inputting the control amounts into the vehicle actuators, respectively as vehicle behavior characteristic data, the vehicle behavior characteristics including a turning characteristic, a acceleration characteristic, and a deceleration characteristic of the vehicle detected by at least one sensor, the control amounts being input to the vehicle actuators to activate the vehicle actuators, respectively, and the vehicle actuators including a turning actuator for turning the vehicle, an acceleration actuator for accelerating the vehicle, and a deceleration actuator for decelerating the vehicle;

(ii) setting an optimal movement route as the target movement route when an update condition is not satisfied, the optimal movement route being determined such that the vehicle is caused to move with reducing (a) a distance of movement of the vehicle from the current position to the destination and (b) time taken for the vehicle to move from the current position to the destination;

(iii) setting an update movement route as the target movement route when the update condition is satisfied, the update condition includes a condition that an execution of the automatic movement control is requested and a condition that there is no occupant in the vehicle, the update movement route being determined such that the vehicle is caused to move with turning, acceleration, and deceleration necessary to update the vehicle behavior characteristic data so as to represent actual vehicle behavior characteristics, wherein the update movement route includes (a) the turning of the vehicle at a predetermined yaw rate for a predetermined time, (b) the acceleration or the deceleration of the vehicle with a predetermined longitudinal acceleration Gx for a predetermined time, and (c) the turning of the vehicle with a predetermined lateral acceleration Gy for a predetermined time, and the update movement route is a different route from the current position to the destination than the optimal movement route;

(iv) executing the automatic movement control to (a) determine the control amounts to be input into the vehicle actuators as automatic control amounts so as to cause the vehicle to move along the target movement route, based on the vehicle behavior characteristic data and (b) input the determined automatic control amounts into the vehicle actuators, respectively when the execution of the automatic movement control is requested, wherein the determined automatic control amounts input into at least one of the vehicle actuators when the update movement route is set as the target movement route are greater than the control amounts input into the at least one of the vehicle actuators when the optimal movement route is set as the target movement route so that the vehicle behavior characteristic data is updated to represent the actual vehicle behavior characteristics;

(v) acquiring the turning characteristic, the acceleration characteristic, and the deceleration characteristic of the vehicle from the at least one sensor while executing the automatic movement control to cause the vehicle to move along the update movement route; and (vi) updating the vehicle behavior characteristic data so as to represent the actual vehicle behavior characteristics, based on the acquired turning characteristics, the acquired acceleration characteristic, and the acquired deceleration characteristic.

2. The vehicle movement control method as set forth in claim 1, wherein the update condition includes a condition that updating of the vehicle behavior characteristic data is needed.

3. The vehicle movement control method as set forth in claim 1, wherein the update condition includes a condition that (i) updating of the vehicle behavior characteristic data is needed, and (ii) there is no occupant in the vehicle.

4. The vehicle movement control method as set forth in claim 1, wherein the vehicle movement control method further comprises a step of determining at least one of the automatic control amounts input into the vehicle actuators to a larger amount when executing the automatic movement control to cause the vehicle to move along the update movement route with no occupant, compared with when executing the automatic movement control to cause the vehicle to move along the same update movement route with the occupant.

5. The vehicle movement control method as set forth in claim 1, wherein the vehicle movement control method further comprises a step of determining at least one of the automatic control amounts input into the vehicle actuators to a larger amount when executing the automatic movement control to cause the vehicle to move along the update movement route, compared with when executing the automatic movement control to cause the vehicle to move along the optimal movement route.

6. The vehicle movement control method as set forth in claim 1, wherein the turning actuator includes a motor driver for activating a steering motor for applying steering torque to a steering shaft.

7. The vehicle movement control method as set forth in claim 1, wherein the acceleration actuator includes a fuel injector actuator for activating a fuel injector for supplying fuel to a combustion chamber of an internal combustion engine.

8. The vehicle movement control method as set forth in claim 1, wherein the deceleration actuator includes a brake actuator for activating a brake mechanism for applying braking force to the vehicle.

9. The vehicle movement control method as set forth in claim 1, wherein the at least one sensor includes a yaw rate sensor for detecting a yaw rate of the vehicle, and wherein the vehicle movement control method further comprises a step of acquiring the turning characteristic, based on the yaw rate detected by the yaw rate sensor.

10. The vehicle movement control method as set forth in claim 1, wherein the at least one sensor includes a lateral acceleration sensor for detecting a lateral acceleration of the vehicle, and wherein the vehicle movement control method further comprises a step of acquiring the turning characteristic, based on the lateral acceleration detected by the lateral acceleration sensor.

11. The vehicle movement control method as set forth in claim 1, wherein the at least one sensor includes a yaw rate sensor for detecting a yaw rate of the vehicle and a lateral acceleration sensor for detecting a lateral acceleration of the vehicle, and wherein the vehicle movement control method further comprises a step of acquiring the turning characteristic, based on the yaw rate detected by the yaw rate sensor and the lateral acceleration detected by the lateral acceleration sensor.

12. The vehicle movement control method as set forth in claim 1, wherein the at least one sensor includes a longitudinal acceleration sensor for detecting a longitudinal acceleration of the vehicle, and wherein the vehicle movement control method further comprises a step of acquiring the acceleration characteristic, based on the longitudinal acceleration detected by the longitudinal acceleration sensor.

13. The vehicle movement control method as set forth in claim 1, wherein the at least one sensor includes a longitudinal acceleration sensor for detecting a longitudinal acceleration of the vehicle, and wherein the vehicle movement control method further comprises a step of acquiring the deceleration characteristic, based on the longitudinal acceleration detected by the longitudinal acceleration sensor.

14. The vehicle movement control method as set forth in claim 1, wherein the at least one sensor includes a longitudinal acceleration sensor for detecting a longitudinal acceleration of the vehicle, and wherein the vehicle movement control method further comprises a step of acquiring the acceleration characteristic and the deceleration characteristic, based on the longitudinal acceleration detected by the longitudinal acceleration sensor.

15. The vehicle movement control method as set forth in claim 1, wherein the vehicle movement control method further comprises a step of executing a normal driving control to (i) determine the control amounts to be input into the vehicle actuators as normal control amounts, based on the driving operation by the driver and (ii) input the determined normal control amounts into the vehicle actuators when the execution of the automatic movement control is not requested.

* * * * *